United States Patent [19]
Barkatt

[11] Patent Number: 4,995,984
[45] Date of Patent: Feb. 26, 1991

[54] SUPPORTED HETEROPOLYCYCLIC COMPOUNDS IN THE SEPARATION AND REMOVAL OF LATE TRANSITION METALS

[75] Inventor: Aaron Barkatt, Silver Spring, Md.

[73] Assignees: Pedro B. Macedo, Bethesda; Theodore Aaron Litovitz, Annapolis, both of Md.

[21] Appl. No.: 408,289

[22] Filed: Sep. 18, 1989

Related U.S. Application Data

[62] Division of Ser. No. 101,920, Sep. 28, 1987, Pat. No. 4,876,232

[51] Int. Cl.$^5$ .............................................. C02F 1/28
[52] U.S. Cl. ................................... 210/670; 210/656; 210/679; 210/682; 210/688
[58] Field of Search ............... 210/670, 679, 682, 688, 210/912-914, 656, 635; 431/2

[56] References Cited

U.S. PATENT DOCUMENTS 4,496,664 1/1985 Motojima ........................... 210/688

Primary Examiner—Ivars Cintins
Attorney, Agent, or Firm—Fleit, Jacobson, Cohn, Price, Holman & Stern

[57] ABSTRACT

Compositions comprising carbon-based supports and containing heteropolycyclic compounds such as bipyridyl, phenanthroline or derivatives thereof are used in separation of dissolved late transition metals such as Fe, Co, Ni and Cu from solutions, in particular when such solutions contain high concentrations of other dissolved metals such as Zr, Hf, La, Al and Ba. Such compositions are also used to separate late transition metals such as Pt group metals from each other.

27 Claims, No Drawings

SUPPORTED HETEROPOLYCYCLIC COMPOUNDS IN THE SEPARATION AND REMOVAL OF LATE TRANSITION METALS

This is a divisional of application Ser. No. 101,920 filed Sept. 28, 1987, now U.S. Pat. No. 4,876,232.

BACKGROUND OF THE INVENTION

Heavy metal fluoride glasses have very low intrinsic loss of light in the near-infrared and mid-infrared range. Therefore, according to Tran et al., Journal of Lightwave Technology, Vol. LT-2, pp. 556–586 (1984) they are attractive for high-energy infrared laser transmissive optics and for ultralong-length fiber optic links. However, various impurities, such as transition metal ions, can produce significant and undesirable absorption in these glasses even when present in very low levels, typically in the part-per-billion range. It is therefore essential to remove ionic contaminants from the ingredients of these glasses and, in particular, from the water-soluble zirconyl compounds and the other compounds used as starting materials in the production of the glasses.

Typical fluorozirconate glasses for optical applications consist of the fluorides of zirconium, barium, lanthanum, aluminum and sodium. Hafnium fluoride is substituted for zirconium fluoride in the cladding region of the fiber. Starting materials containing Zr, Ba, La, Al, Na and Hf therefore require purification to remove contaminants, in particular transition metal ions. However, fluorozirconate glass fibers can also be prepared using other formulations, containing fluorides of metals such as Gd, Li, Pb, Th, Ca, Y instead of, or in addition to, one or more of the components listed above. Zirconium is usually of major concern because of its high levels in common heavy metal fluoride glass formulations. The corresponding starting materials are water-soluble zirconyl compounds, which can be purified in solution, and then subjected to precipitation of zirconium as the hydroxide or oxide. The most important transition metal contaminants in fluoride glasses and in their precursors include Co, Fe, Ni and Cu.

Other uses of compounds of various metals also require a high degree of purity with respect to contaminants such as Co, Fe, Ni and Cu. High-purity lanthanum oxide for instance, is used in producing optical glass with high refracting index; other rare earths are used in solid-state devices. Solid-state lasers provide one application where the presence of certain impurities at low levels can have highly detrimental effects. In these cases and others the presence of small amounts of the contaminants mentioned above can have major undesirable effects on optical, electronic and magnetic properties.

In general, the transition metals are often divided into several subgroups. For instance, according to the book "Inorganic Chemistry of the Transition Elements", Volume 1, edited by B.F.G. Johnson, The Chemical Society, London, 1972, these elements can be divided both by row, distinguishing early transition metals such as those belonging to Groups IIIa and IVa (the scandium and titanium groups, respectively) of the Periodic Table from late transition metals, and according to period, distinguishing the first transition series from the second and third series, which include less reactive, more noble metals. For present purposes, the contaminants to be removed using the methods of this invention are late transition metals, defined as those belonging to Groups Va, VIa, VIIa, VIII, Ib and IIb of the Periodic Table. (Group nomenclature is according to F.A. Cotton and G. Wilkinson, Advanced Inorganic Chemistry, 4th ed., Wiley-Interscience, New York, N.Y., (1980)). Many of these elements, in particular those in the first transition series, have oxidation states in which they have strong optical absorption in the near-uv, visible, near-ir and mid-ir ranges. Many of these oxidation states are also paramagnetic.

Many methods have been used to separate late transition metal contaminants from compounds of other metals, including chemical precipitation or co-precipitation, fractional crystallization, distillation and sublimation. The most widely used methods in large-scale, high-efficiency purification and removal of late transition metal impurities include solvent extraction and ion exchange.

According to J. Korkisch and A. Farag, "Analytical Chemistry of Zirconium. II. Enrichment of Zirconium as Negatively Charged Sulphate Complex on the Strongly Basic Ion Exchanger Amberlite IRA-400 and Its Separation from Thorium, Titanium, Iron, Aluminum and Many Other Elements", Zeitschrift fuer analytische Chemie, 144, 81–88, (1959), the fact that zirconium is strongly retained on Amberlite IRA-400 or Dowex 1 or 2 anion exchange resins from a 0.1 N sulfuric acid solution allows zirconium to be separated from many elements, including copper, trivalent iron, cobalt and nickel. Zirconium is subsequently eluted from the bed with 4 N hydrochloric acid. According to F.W.E. Strelow, "Separation of Zirconium from Titanium, Ferric Iron, Aluminum, and Other Cations by Cation Exchange Chromatography", Analytical Chemistry, 31, 1974–1977, (1959), the sorption of zirconium on a BioRod AG50W, X8 cation exchange resin from a 2 N hydrochloric acid solution has been used for its separation from many elements, including divalent and trivalent iron, copper, nickel and cobalt. Zirconium is subsequently eluted with 5 N hydrochloric acid.

These and similar ion exchange methods generally have several disadvantages. Zirconium is sorbed on the ion exchange bed in preference to the impurities, and this limits both the efficiency and the capacity of the column and requires elution to be carried out whenever a small volume of zirconium solution has passed through the medium, provided the solution has a moderately high concentration of Zr. Since the capacities of cation exchange resins are usually less than 5 meq/mL and those of anion exchange resins less than 2 meq/mL, it follows that no more than 1.25 volumes of a 1 M Zr solution (91 g/L or 5 meq/L of Zr) can be sorbed on a volume of cation exchange resin and no more than 0.5 volume of the same solution on a volume of anion exchange resin. Furthermore, the eluted Zr solutions in both cases are highly acidic and they require a large amount of base to precipitate zirconium hydroxide or hydrous oxide, resulting in a large increase in volume and risk of re-contamination. It is therefore very desirable to sorb late transition metal impurities preferentially on the ion exchange or sorption medium from the zirconium solution, and this requires the medium to have higher affinity for these impurities than for zirconium. In the case of conventional cation exchange resins the ions of Zr and of similar elements, e.g. Hf, La and Al are generally sorbed on the resin in preference to ions of late transition metals such as Fe, Co, Ni and Cu because of the higher charge density (charge-to-size ratio) of the former ions. In the case of conventional anion exchangers, the extent of sorption of various metals depends on the stabilities and charge densities of the respective anionic complexes. In the case of high chloride concentrations, for instance, Co, Cu and Ni adsorb on anion exchange resin to a lesser extent than Zr, Hf and Ga, according to R.M. Diamond and D.C. Whitney, "Resin Selectivity in Dilute to Concentrated Aqueous Solutions", Chapter 8, in the book "Ion Exchange", Vol. 1, by J.A. Marinsky, Marcel Dekker, New York, N.Y., 1966, pp. 277–351. According to the same authors, Co, Ni, and Cu are not adsorbed on anion exchangers from nitrate media. Accordingly, conventional anion exchange resins are not expected to be useful in removing dissolved late transition metals from solutions containing large amounts of other dissolved metals such as Zr, Hf and Ga.

Several of the most important species which require purification for optical, electronic and other applications, such as Zr, Hf, or, to a lesser extent, La and Bi, as well as other multivalent metals, are stable in solution only at very low pH values, typically below pH 2–3. This hinders their purification by means of cation exchange resins and even chelating ion exchange resins such as BioRad Laboratories Chelex 100 which show a drastic decrease in capacity as the pH decreases from about 4 to below 2.

According to Klein et al., Optical Engineering, Vol. 24, pp. 516–517 (1985), standard ion exchange methods can be used to remove iron, cobalt, nickel and copper from zirconyl ion solution. However, column capacities are not given, and they can be expected to be very low based on the previous references, which show zirconium ions to have higher affinity to both cation exchange and anion exchange resins. The residual concentrations after ions exchange in the cases of Fe, Co and Ni are 0.38, 0.36 and 1.15 ppm, respectively, or 5%, 5% and 16%, respectively, of their initial levels in the influent.

It is therefore very desirable to have an ion exchange or sorption medium with high selectivity for late transition metal impurities in the presence of relatively high concentration of ions with high charge density. Such selective sorption also permits pre-concentration of trace impurities on the solid medium for analytical purposes.

Various organic compounds are known to form complexes with late transition metal ions which can be used in solvent extraction procedures of separating these ions from aqueous solutions.

Heteropolycyclic compounds based on the bipyridine or bipyridyl structure:

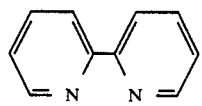

or $NC_6H_4$-$C_6H_4N$ structure are known to form colored complexes with certain late transition metal ions, in particular ferrous and cuprous ions. In general, a heteropolycyclic compound can be defined as a compound having at least two rings which are not fused directly together, with one or more heteroatoms, in particular nitrogen atoms, in the structure of at least one of the rings. According to the books "The Iron Reagents" (1960) and "The Copper Reagents" (2nd ed., 1972), both by H. Diehl and G.F. Smith, published by The G. Frederick Smith Chemical Company, Columbus, Ohio, many compounds which include the $NC_6H_4$-$C_6H_4N$ structure form complexes with the ions mentioned above. These include 1,10-phenanthroline:

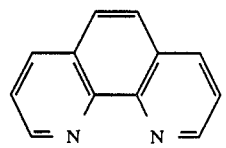

and its derivatives such as 4,7-diphenyl-1,10-phenanthroline (bathophenanthroline), 2,9-dimethyl-1,10-phenanthroline (neocuproine), 2,9-dimethyl-4,7-diphenyl-1,10-phenanthroline (bathocuproine) and 2,2'-biquinoline or 2,2,'-biquinolyl (cuproine). Other heteropolycyclic compounds which form similar complexes have structures which are not directly based on the bipyridine or phenanthroline structure but all of them contain two non-fused rings with at least one ring containing a nitrogen atom. Such compounds include 2,4,6-tripyridyl-s-triazine (TPTZ) and syn-phenyl-2-pyridyl ketoxime.

According to Hach, U.S. Pat. No. 3,095,382, iron in water is determined colorimetrically with a mixture of about 40% $Na_2S_2O_4$, 60% $NaHSO_3$ or $Na_2S_2O_5$, and 4% of a heterocyclic compound, such as 1,10-phenanthroline. About 0.1 g of the mixture added to 25 mL of water dissolves oxides, reduces the iron, and buffers the sample at pH 6.5 where the color is developed. The composition of the mixture can be varied over wide limits.

According to the books "The Iron Reagents" and "The Copper Reagents" by H. Diehl and G.F. Smith cited above, complexes of heteropolycyclic compounds with late transition metal ions can be extracted into solvents such as isoamyl alcohol or 3-methylbutan-1-ol, 1-hexagonal and nitrobenzene. However, the use of a solid sorbent or ion exchange medium offers many advantages over solvent extraction in the removal of trace impurities. In particular, the use of packed columns or beds provides a large number of equilibration and separation stages, known as theoretical plates, over a short length. The problems of liquid phase miscibility, of impurity concentration at interfaces, of contamination of the product stream with the solvent and of the presence of hazardous solvent vapors are avoided.

Furthermore, according to the books "The Iron Reagents" and "The Copper Reagents" by H. Diehl and G.F. Smith cited above, the heteropolycyclic compounds which form complexes with late transition metal ions are usually specific to only one or a few of these ions. For instance, compounds bearing substituent groups on the carbon atoms adjacent to the ring nitrogen atoms of the bipyridine or phenanthroline structure form colored complexes with copper, but not with iron. Accordingly, solvent extraction techniques have traditionally been based on the use of different complexing compounds for different ions, e.g. 1,10-phenanthroline, bathophenanthroline, TPTZ and phenyl-z-pyridyl ketoxime for iron and cuproine, neocuproine and bathocuproine for copper.

Various organic chelating agents, including heteropolycyclic compounds such as 1,10-phenanthroline (o-phenanthroline) and neocuproine, as well as other chelating agents such as 8-hydroxyquinoline (oxine), dithizone and salicylaldoxime, can also be coupled to insoluble inorganic carriers such as silica, silica gels, glass, porous glass, bentonite, hydroxyapatite, alumina, and nickel oxide by means of an intermediate silane coupling agent, according to Shucker et al., U.S. Pat. No. 3,886,080. According to this patent, the chelating agent is bonded to the silane coupling agent by means of an azo linkage. The immobilized chelating agents can be used to remove trace metals such as Fe, Cu, Mo, Zr, V, W and Ti, from solution. However, silanization is a complicated and expensive technique. Used to remove trace metals from raw materials for fluoride glass production or other applications it can lead to contamination with undesirable traces of Si. The expected loading of the support with the chelating agent is low, and, in the Example listing efficiencies for the removal of various metals, using a porous glass-oxine material, zirconium is observed to be effectively sorbed, indicating that such combinations are not suitable for selective separation of late transition metal impurities from zirconium solutions. According to U.S. Pat. Nos. 4,421,654 and 4,448,694 by Plueddenann transition metal ions can be removed from solution using a method which comprises contacting a solution containing these ions with an inorganic solid substrate, such as silica gel, treated with a silylating agent which a polyamine derivative. This process does not make use of substrates based on the bipyridyl or phenanthroline structure.

British Pat. No. 1,355,535 describes a method for extracting a metal from a solution containing an ion of this metal which comprises contacting the solution with an adsorbent which is peat or brown coal or a brown coal char in the presence of ammonia capable of forming a stable complex with the metal. The ammonia derivative is an aliphatic amine, a hydroxy-aliphatic amine or a nitrogen-containing heterocycle such as pyridine. There is no mention of heteropolycyclic compounds. This method is used to recover metal values from solution but the patent does not address selective removal or separation of various metals such as the removal of late transition metal ions from solutions of Zr, Hf, Al, La or other multivalent metal ions. Furthermore, a major difference between this patent and the present invention is that according to the patent, the ammonia derivative is added to the metal solution rather than used to pretreat the carbonaceous support. This process is much less suitable for decontamination of nuclear plant effluents or other streams than the use of a pre-treated support according to the present invention.

U.S. Pat. No. 4,222,892 by Motojima et al. describes a process for preparing charcoal impregnated with oxine (8-hydroxyquinoline) which comprises contacting solid oxine with the charcoal until the charcoal becomes impregnated with the oxine. This Patent mentions the use of supported oxine to remove heavy metals from solution but does not address selectivity in such removal and does not mention supported reagents other than oxine.

U.S. Pat. No. 4,659,512 by Macedo et al. describes a process for removing metal species from solution using porous silicate glass, silica gel or charcoal containing an alkylene amine. Heteropolycyclic compounds are not used.

U.S. Pat. No. 3,917,453 by Milligan et al. mentions 1,10-phenanthroline or 4,7-diphenyl-1,10-phenanthroline coated on silica gel to assist in obtaining a permanent record of the determination of glucose by means of a ferric salt. This patent does not address removal of metal late transition ions from solution or their separation from other ions.

In addition to removing dissolved late transition metals from solution, it is often desired to separate them from each other, for instance in the preparation of catalysts based on individual noble metals of the last two rows of Groups VIIa and VIII of the Periodic Table.

Furthermore, in addition to the problem of removing dissolved late transition metals from solutions, it is often necessary to immobilize and concentrate such metals from various media for purposes such as management of radioactive or toxic metal species (e.g. Co-60, Co-58 or Fe-59), recovery of precious metals (e.g. Pt and Pd), or accurate analysis of trace metals.

It is an object of this invention to provide a simple and convenient process of removing late transition metal species from liquid streams.

Another object of this invention is to make sorption media which will selectively remove dissolved late transition metal species such as Fe, Co, Ni and Cu from liquid streams in the presence of large excess amounts of other dissolved metal species such as Zr, Hf, La, Al, Ga, In, Sc, Y and Ba.

Yet another object of this invention is to provide a method for removing dissolved late transition metals from acidic solutions.

It is also an object of this invention to provide a process for producing highly pure starting materials for the preparation of highly transparent optical glasses and fibers, in particular fluorozirconate glasses and fibers.

It is also an object of this invention to provide a process for the selective recovery of particular dissolved late transition metals from liquids that contain more than one dissolved transition metal.

It is a further object of this invention to provide sorption or ion exchange material in order to concentrate low levels of dissolved late transition metals for purposes of radioactive or toxic species management, valuable metal recovery, and trace analysis.

SUMMARY OF THE INVENTION

The present invention uses a composition in which a heteropolycyclic compound or functional group is immobilized by an attachment to a support. The heteropolycyclic species may be attached to the solid support by means of physical or chemical sorption. The solid support is porous and consists of an activated carbonaceous material, preferably charcoal.

The heteropolycyclic compounds used in the present invention form complexes, when present in solution, with dissolved late transition metal species such as dissolved Fe, Co, Ni and Cu. It is an essential and surprising aspect of the present invention that the heteropolycyclic species retains significant affinity or complex-forming ability towards dissolved late transition metal species even when the heteropolycyclic species are sorbed on the surface of the solid support, in particular on the internal surface of the pore structure of the support material. The loading of the heteropolycyclic species on the support is sufficient to provide significant capacity for the removal of dissolved late transition metal species from a solution which is brought in contact with the medium comprising the heteropolycyclic species attached onto the support. The rate of reaction between the supported heteropolycyclic compound of functional group and the metal species permits a significant removal of the latter from solution when this solution is passed through a bed or column packed with the medium.

The heteropolycyclic compounds used in the present invention are attached to the solid support by means of sorption or precipitation rather by means of covalent bonding through a coupling agent. The preferred method is sorption from a solution of the heteropolycyclic compound. Most preferably the solution is not oversaturated. It is surprising to find that the use of the resulting media to treat solutions with a high salt content, even at high acidities, does not result in rapid leakage of the heteropolycyclic compound from the support. Instead, beds consisting of such media have been found useful in highly efficient removal of late transition metal ions from significantly large volumes of such solutions passed through these beds.

The media of this invention comprising heteropolycyclic species attached onto a solid support are distinguished by a high degree of selectivity for removal of dissolved late transition metal species from solution. It is an essential and surprising aspect of this invention that these media, unlike ion exchange resins in general, have a high selectivity for dissolved late transition metal species over other dissolved metal species, including metal ions with high charge densities such as $Zr^{4+}$, $Hf^{4+}$, $La^{3+}$ and $Al^{3+}$, even when the late transition metal species are present in solution in trace amounts, typically ranging from several parts per million downward to less than one part per billion relative to the concentrations of the other dissolved metal species.

It is also an essential and surprising aspect of this invention that the media comprising heteropolycyclic species attached onto a solid support can be used for effective and selective removal of dissolved late transition metal species from solutions even at very low pH levels. Previously described chelating ion exchange media such as the iminodiacetate styrene-divinylbenzene copolymer resin Bio-Rad Chelex-100 have a high capacity above pH 4, but their capacity sharply decreases from pH 4 to pH 2 and is very low below pH 2, according to Bio-Rad Laboratories Product Information 2020, "Separating Metals Using Chelex 100 Chelating Resins", Bio-Rad Laboratories, Richmond, Calif., July 1978. In contrast, a charcoal column treated with 1 g of 1,10-phenanthroline per 10 mL of charcoal has been found to have a significant capacity for the removal of Fe, Co, Ni and Cu from solutions of $ZrOCl_2$ at a concentration equivalent to approximately 10% $ZrO_2$ and at pH levels ranging between 0.5 and 2.

In addition to indiscriminate removal of late transition metal species from solution, the present invention also provides separation media and processes, based on the immobilization of heteropolycyclic compounds on solid supports, which permit selective separation of such late transition metal species from each other, for instance the selective removal of Pt and Pd from solutions containing Rh and Ru, even when such solutions are highly acidic.

In addition to removing late transition metal species from solutions in order to purify these solutions and to separating late transition metal species from each other, the present invention provides materials and processes based on the immobilization of heteropolycyclic compounds on solid supports which can be used to concentrate dissolved late transition metals present at low levels in solution. These materials and processes can be used, for instance, in management of radioactive or hazardous wastes, in precious resource recovery, and for analytical purposes.

DETAILED DESCRIPTION OF THE INVENTION

The removal of dissolved late transition metal species from a liquid containing the dissolved late transition metal species includes passing the liquid over a composition having a porous support with interconnected pores. The composition is characterized in that its internal surface contains one or more heteropolycyclic moieties capable of forming a stable complex or compound with one or more late transition metal species. The heteropolycyclic moiety is present in an amount effective to complex, react with, or attach the dissolved late transition metal species over the compositon having the porous support containing the heteropolycyclic moiety or moieties, the dissolved late transition metal species are removed from the solution due to the formation of a complex or a compound with the heteropolycyclic moiety or moieties.

As defined above, the heteropolycyclic moiety contains at least two rings which are not fused directly together, with at least one ring having one or more heteroatoms, in particular nitrogen atoms, as a part of the ring. In particular, this invention involves heteropolycyclic moieties containing at least one pyridinoid ring, i.e. a six-membered aromatic ring with a nitrogen atom replacing one of the $=CH-$ members of the ring. Preferred moieties according to this invention contain a bipyridine or bipyridyl structure, preferably with the nitrogen atoms in the 2,2' positions.

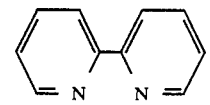

Various substituents may be attached to this structure, including other rings conneeted indirectly or directly to the bipyridyl structure or fused to the bipyridyl rings. The most preferred moieties according to this invention contain a phenanthroline structure, most preferably with the nitrogen atoms in the 1,10 positions. Various substituents may be attached to this structure. In particular, 1,10-phenanthroline itself is found to be effective in preparing sorption media according to this invention. In sorbing the heteropolycyclic moiety onto the surface of the support, either 1,10-phenanthroline itself or one of its salts such as 1,10-phenanthroline hydrochloride is used. According to the literature, for instance the books "The Iron Reagents" (1960) and "The Copper Reagents" (2nd ed., 1972), both by H. Diehl and G.F. Smith, published by the G. Frederick Smith, Corp., Columbus, Ohio, the heteropolycyclic compounds which form complexes with late transition metal ions are usually specific to only one or a few of these ions. For instance, compounds bearing substituent groups on the carbon atoms adjacent to the ring nitrogen atoms of the bipyridine or phenanthroline structure form colored complexes with copper, but not with iron. Compounds not bearing such substituent groups are preferred for iron, but not for copper. According to the literature, for instance bipyridine and phenanthroline compounds and their derivatives are not among the common reagents used to complex cobalt and nickel. In view of these teachings, it has been surprising to find that supported 1,10-phenanthroline media are effective in removing from solution multiple late transition metal ions, including Fe, Co, Ni and Cu, even when these various late transition metal ion mixtures are present in solutions containing a large excess of other metal ions. In other words, the selectivity of supported 1,10-phenanthroline supported media is more pronounced with respect to preference for late transition metal ions as a group over other metal ions than with respect to preference for various late transition metal ions over each other. Other phenanthroline derivatives, such as bathophenanthroline, neocuproine, and bathocuproine, bipyridyl derivatives, such as cuproine, and other heteropolycyclic compounds, such as TPTZ and syn-phenyl-2-pyridyl ketoxime may also be used in the present invention.

The porous support has interconnected pores. The porous support in accordance with the present invention is an activated carbonaceous material which largely consists of an amorphous of microcrystalline nongraphitic form or carbon with a large internal porosity and surface area. Such materials include activated forms of coke, anthracite, char, brown coal, e.g. lignite or bituminous coal, brown coal char, and charcoal. The activation of the carbonaceous materials is carried out by gas or chemical treatment to create a large surface area and porosity. The preferred support is charcoal. Charcoal is a form of amorphous carbon and is obtained from the destructive distillation of wood, sugar, coal and other carbonaceous materials. Specifically, activated carbonaceous materials or carbons have a large specific area and is designated for absorption from the gas and liquid states. The specific area of the activated carbon may range from about 10 to about 5000 $m^2/g$, preferably between about 200 and about 3000 $m^2/g$. Pore diameters are between about 0.5 nm and about 10000 nm. Activated granular and powdered carbon includes a pore structure created by the steps of driving off constituents from the carbonaceous raw materials and partially oxidizing the residue. The oxidation is typically conducted by means of steam, flue gas, air or carbon dioxide. The charcoal used in accordance with this invention is most preferably produced from wood such as coconut or other nut shells.

Activated charcoal has now been found to be effective in sorbing heteropolycyclic molecules by simply contacting it with a solution of the heteropolycyclic compound. The sorption process is rapid, the sorbed molecules are strongly attached to the charcoal and do not desorb very quickly, yet they retain their reactivity towards late transition metal ions, and the amount of sorbed heteropolycyclic compounds is sufficient to give significantly high capacities in removing such metal ions from solution. A solution of the heteropolycyclic compound is contacted with the solid support in a container, preferably shaking, rolling or stirring the solid with the solution, or is passed through a column loaded with the support. It is also possible to use precipitation methods such as pH change, solvent exchange or solvent evaporation. For instance, 1,10-phenanthroline is much less soluble in water than its hydrochloride salt, and therefore it can be precipitated from the hydrochloride solution by raising the pH. Sorption of the organic compound from the solid or gas phases, for instance as described in U.S. Pat. No. 4,222,892, is also possible. Sorption from solution is the preferred method of attaching the heteropolycyclic moiety to the support. It is much less complicated and less expensive than covalent bonding as described by Shucker et al., U.S. Pat. No. 3,886,080. Sorption does not require introduction of silanes and it can be used to obtain high levels of loading of the heteropolycyclic moiety on the support. It is surprising that the substitution of sorption for covalent bonding does not cause excessive leakage and bleeding of the heteropolycyclic compound in amounts that would preclude its use in the applications detailed below such as removal of Fe, Cu, Ni and Co from acidic Zr solutions, or the separation of components of acidic precious metal solutions using 1,10-phenanthroline, sorbed on charcoal. Even more surprisingly, the amount of bleeding is small even in highly acidic media and in media such as 0.1-0.2 M HCl and in media with very high ionic strength such as 10-20% $ZrOCl_2$ solutions at pH of about 0.5-1. In order to reduce leakage even further, a bed of untreated support material, e.g. charcoal, may be placed downstream following the treated support bed during operation.

The grain size of the solid particles is between about 0.5 microns and about 6000 microns. In one preferred embodiment, the solution containing the dissolved late transition metals is passed through a column packed with the supported heteropolycyclic moiety. For operations in column mode a particle size between about 25 microns and about 2000 microns is preferred. The loading of the heteropolycyclic moiety on the support is between about 0.01% and about 60% by dry weight, preferably between about 0.1% and about 50% by dry weight, most preferably between about 1% and about 40% by dry weight.

The support having the heteropolycyclic compound sorbed or attached to it is contacted with a stream containing the late transition metal species. The contact preferably takes place in a packed column. The solution to be purified can contain very high concentrations of other metal ions, for instance zirconium oxychloride at an equivalent concentration of 20% $ZrO_2$, or zirconium acetate at an equivalent concentration of 22% $ZrO_2$, or a solution of 250 g/L of $La(NO_3)_3.6H_2O$ in water. Dissolved metals present in the solutions at high concentrations, typically above about 10 g/L, include alkali metals such as Na and, in particular, multivalent metals. The media described here have been found to be effective in removing dissolved late transition metals from near-neutral and moderately acidic streams (pH 4.0-2.0) and even at high acidity (pH 2.0-0.5). It has been observed that even under conditions of very high solute concentrations and high acidity ($ZrOCl_2$ solution, equivalent concentration 20% $ZrO_2$, pH 0.5) 1 unit volume of supported heteropolycyclic medium, for instance charcoal treated with 1,10-phenanthroline, can remove more than 90% of the Fe, Co, Ni and Cu species contained in more than 10 volumes of solution. The term "column volume" (CV) is often used in this context and means 1 volume of solution per 1 volume of charcoal or other support. The performance of charcoals treated with heteropolycyclic compounds under such conditions has been found to be considerably better than the performance of other sorption and ion exchange media such as polystyrene-based cation-exchange, anion-exchange and chelating resins, charcoal treated with other chelating agents such as triethylenetetramine and 8-hydroxyquinoline, and porous silicate glass, silica gel and alumina treated with heteropolycyclic compounds by sorption or by covalent bonding with a silanizing agent.

It has been observed that the support having the heteropolycyclic compound sorbed to it, for instance charcoal treated with 1,10-phenanthroline, can be used to remove dissolved late transition metals from solutions in which the major anionic species include, for instance, chloride, oxychloride, nitrate and acetate.

The solution from which the dissolved late transition metals are to be removed may be treated with a reducing solute such as hydroxylamine hydrochloride to convert oxidized species such as ferric and cupric ions to reduced species such as ferrous and cuprous ions. This may be used, for instance, to stabilize the solution to be contacted with the treated supports and prevent the formation of colloids. Micro- or ultra-filtration, centrifugation and recrystallization can also be used to eliminate colloidal material before metal ions using the treated supports described above.

In one embodiment of the invention, a solution is passed through a bed or a column of a support carrying a heteropolycyclic moiety in order to remove dissolved late transition metals from the solution. This process is particularly useful in purifying solutions containing high concentrations of other metals. Since a higher charge is generally a major factor in enhancing removal of ions from solutions on ion exchange media, this process is particularly useful when the other metals are multivalent, such as the alkaline earths and Group IIIa, IVa, IIIb, IVb and Vb metals. It is most useful when the valence of the other metals is above 2. The purified major solutes in such solutions, such as Zr, Hf, Ti, Th, La, Al, Ga, In, Sc, Y and Ba compounds, can be subsequently recovered in solid form to produce or to be incorporated in high-purity products such as low-loss optical glasses and fibers, solid state lasers, or high-performance electronic components, in particular semiconductor devices. The concentrations of these other metals in the solution may be high, typically above 10 g/L.

A bed or a column packed with a heteropolycyclic moiety can be used for the separation of dissolved late transition metals from each other. For instance, in the case of highly acidic mixed noble metal solutions encountered in catalyst recovery it is possible to recover Pt and Pd selectively on a column consisting of charcoal treated with 1,10-phenanthroline while Rh and Ru are not removed. Pt and Pd can be subsequently released from the column packing by elution under more drastic conditions, e.g. using concentrated acids, or by chemical oxidation or incineration of the column material.

Supports carrying heteropolycyclic moieties can also be used to immobilize and concentrate dissolved transition metals present in solution at low levels. For instance, toxic or radioactive species such as Fe-59, Co-58 and Co-60 may be removed from aqueous streams, particularly those containing high concentrations of other solutes, and immobilized on the treated supports. Precious metals such as Pt and Pd can be concentrated from solutions containing low concentrations of such metals for resource recovery, particularly when other metals are present at higher concentrations. Concentration and volume reduction are also useful for trace analytical applications. For instance, in the determination of low levels of radioactive ions such as Fe-59, Co-58 and Co-60 from streams, in particular streams with a high content of other metals, it is possible to preconcentrate the radioactive ions by contacting the solution with the treated supports and counting the radioactive species on the column itself or following a suitable stripping procedure. Likewise, in radioactive or toxic species management or precious metal recovery sorbed species may be subsequintly removed from the spent column using methods such as elution or incineration for secondary treatment. Alternatively, the column can be used for final immobilization and solidification, in particular in the disposal of toxic and radioactive wastes. Effective concentration of low levels of late transition metal ions from solution requires the treated support to have a capacity of at least about 10 column volumes, preferably at least about 50 column volumes, for these ions. In other words, the concentrations of these ions on such a support are higher by a factor of at least about 10, preferably at least about 50, than the concentrations of these ions in the solution before the solution has been contacted with the treated support.

The following non-limiting Examples further illustrate the invention.

EXAMPLE 1

A series of column runs using radioactive tracers were carried out on the removal of late transition metal ions from solutions of other multivalent metal ions. One of the tested materials was C-o-Phen, prepared by stirring together 500 mL of activated carbon based on coconut shell; ($-50+100$ mesh) with a solution of 100 g of 1,10-phenanthroline monohydrochloride in 1666 mL of de-ionized water for 20.5 hours. A second material was G-o-Phen, made by rolling 150 mL of silica gel, ($-35+70$ mesh), in a polyethylene bottle at approximately 60 rpm for 16 hours with a solution of 15 g of 1,10-phenanthroline monohydrochloride monohydrate, in 300 mL of water. A third material was a cation exchange resin, designated CGC-240, Analytical Grade, which is a strong-acid sulfonated polystyrene resin with 8% cross-linking, ionic form Na, $-100+200$ mesh (J.T. Baker Chemical Co., Phillipsburg, N.J.). A fourth material was an anion exchange resin, designated Dowex ® 2-X8, Analytical Grade, which is a strong-base quaternary amine polystyrene resin, ionic form Cl, $-20+50$ mesh (J.T. Baker Chemical Co., Phillipsburg, N.J.). A fifth material was a chelating resin, designated Chelex ® 100, Analytical Grade, which is an iminodiacetate polystyrene resin, ionic form Na, $-100+200$ mesh (Bio-Rad Laboratories, Richmond, Calif.). A sixth material, oxine-impregnated charcoal or C-Oxine, was prepared in exact accordance with U.S. Pat. No. 4,222,892 by Motojima et al. by shaking 100 g of coconut shell activated charcoal with 500 mL of water and 10 g of oxine crystalline powder in a 1000-mL flask. A seventh material, 1,10-phenanthroline covalently bound to porous silica glass or GS-o-Phen, was prepared in exact accordance with Example 4 in U.S. Pat. No. 3,886,080 by Shucker et al. by refluxing 10 g of porous silica glass with 100 mL of 10% (v/v) aminopropyltriethoxysilane for 19 hours, washing the product with toluene, refluxing in a mixture of 100 mL of chloroform, 5 mL triethylamine and 1g p-nitrobenzoylchloride for 18 hours, washing with chloroform, and air-drying. The product was boiled for 30 minutes in 100 mL of water containing 5 g of sodium dithionite, diazotized with 1 g $NaNO_3$ in cold 2 M HCl for 30 minutes, washed with cold water, and reacted with 200 mg of 1,10-phenanthroline in 20 mL of 0.1 M $Na_2CO_3$ for 24 hours at 0°-6° C., and then washed with an $Na_2CO_3$ solution, dilute HCl, distilled water, and acetone, and then allowed to dry.

Each test column consisted of 5 mL of one of the materials detailed above packed into a borosilicate glass tube with a cross-section area of approximately 40 mm².

The test solutions used in this test included aqueous 15.6% (w/w) $ZrOCl_2$ in water, 16.3% (w/w) $HfOCl_2$ in water, and 2.9% $Al(NO_3)_3.9H_2O$ in water. Each of the solutions was doped with 1 nCi/mL of Co-60 and 1 nCi/mL of Fe-59. The solutions were pumped through the columns. The flow rate was approximately 12 mL/hr in all cases. Samples of the effluent were taken at various time, counted, and their measured activities compared with that of the influent in order to obtain the decontamination factor (DF), i.e. the ratio between the activities of the influent and of the effluent respectively.

TABLE 1

| ZrOCl₂ | | | | | |
|---|---|---|---|---|---|
| CGC-240 | | C-Oxine | | C-o-Phen | |
| CV | DF | CV | DF | CV | DF |
| 7 | 1.3 | 3 | 1.9 | 16 | 118.1 |
| 17 | 1.0 | 10 | 1.3 | 37 | 65.7 |
| G-o-phen | | GS-o-Phen | | 50 | 20.0 |
| CV | DF | CV | DF | 64 | 12.1 |
| 2 | 34.5 | 2 | 2.0 | 74 | 9.6 |
| 6 | 1.8 | 7 | 0.9 | 97 | 8.6 |
| 13 | 1.2 | | | 263 | 9.1 |
| Dowex 2-X8 | | Chelex 100 | | 372 | 9.4 |
| CV | DF | CV | DF | 402 | 8.8 |
| 3 | 2.4 | 3 | 6.7 | 418 | 6.3 |
| 8 | 1.4 | 10 | 1.3 | 480 | 5.9 |
| | | | | 516 | 4.7 |

| HfOCl₂ | | | |
|---|---|---|---|
| CGC-240 | | C-o-Phen | |
| CV | DF | CV | DF |
| 2 | 1.8 | 11 | 164.7 |
| 5 | 1.5 | 16 | 41.4 |
| 13 | 1.1 | 21 | 5.1 |
| | | 30 | 2.9 |
| | | 35 | 2.4 |
| | | 53 | 2.0 |
| | | 66 | 1.8 |
| | | 93 | 1.8 |
| | | 103 | 1.8 |

| Al(NO₃)₃ | | | |
|---|---|---|---|
| CGC-240 | | C-o-Phen | |
| CV | DF | CV | DF |
| 20 | 258.0 | 32 | 400.5 |
| 89 | 173.7 | 75 | 48.8 |
| 100 | 0.2 | 129 | 38.3 |
| 109 | 0.9 | 150 | 42.2 |
| | | 182 | 43.9 |
| | | 224 | 41.1 |
| | | 250 | 41.9 |
| | | 291 | 39.6 |
| | | 304 | 14.7 |
| | | 318 | 1.6 |

The measured activities were combined Co-60 and Fe-59 activities. The results of the DF measurements are given in Table 1 as a function of the volume passed through each column at the time of sampling. This volume is expressed in number of column volumes, CV, which is obtained by dividing the volume of solution passed in the column by the volume of the column.

It can be concluded that 1,10-phenanthroline sorbed on activated carbon has much higher capacity for the removal of late transition metal ions from solutions of other metals such as Zr, Hf and Al compared with the capacities of 1,10-phenanthroline on silica gel and of a strong-acid polystyrene-based cation exchange resin.

EXAMPLE 2

A series of column runs using conventional chemical methods of analysis, i.e. absorption spectrophotometry and dc plasma spectrometry, were carried out on the removal of late transition metal ions from solutions of barium ions and. The materials tested here were C-o-Phen a-d G-o-Phen described in the previous Example. In addition, Dowex® 2-X8 was tested. This is a strongly basic, Analytical Grade anion exchange resin, ionic form Cl, −20 +50 mesh (J.T. Baker Chemical Co., Phillipsburg, N.J.).

Several columns, each of them loaded with 5 mL of one of the materials specified above, were tested for the removal of late transition metal ions from aqueous barium solutions. These solutions were doped with one or more of several late transition metal ions. The doping level for each of these ions was 2 mg/L. The solutions were pumped downwards through the columns. The flow rate in each case was approximately 10 mL/hr. Column effluents and influents were analyzed using absorption spectrophotometry, as detailed in Example 1, or dc plasma spectroscopy. The results were measured in terms of effluent concentration as a function of number of column volumes, CV, through the column. These data were used to determine the capacity of the columns in each case. The capacity of a column with respect to a given dopant is defined as the number of column volumes at which the concentration of this dopant in the effluent reaches one half of its value in the influent, i.e. the point at which the decontamination factor of the column with respect to this dopant falls below a value of 2. The results of column runs on various aqueous solutions are shown in Table 2.

TABLE 2

| Test solution | Column medium | Capacity, CV | | | |
|---|---|---|---|---|---|
| | | Cu | Fe | Co | Ni |
| 4.62% Ba(NO₃)₂ | C-o-Phen | >373 | >373 | 83 | >373 |
| | G-o-Phen | <2 | <2 | <2 | <2 |
| | Dowex 2-X8 | 1 | 3 | <1 | <1 |

The results show that 1,10-phenanthroline sorbed on charcoal has a significant capacity for removal of late transition metal ions from solutions of Ba salts unlike the other materials used in this test.

EXAMPLE 3

Two solutions containing precious metals were prepared using standard solutions. Solution A was targeted to contain 20 mg/L each of Pt, Pd and Rh in 0.14 M HCl, and Solution B to contain mg/L each of Pt, Pd and Ru in 0.18 M HCl. C-o-Phen was prepared by rolling 10 g of activated carbon (see previous Examples) with a solution of g of 1,10-phenanthroline in 100 mL of absolute ethanol at approximately 60 rpm for 1 hour. Each of the solutions was passed downwards under gravitation through a column of 2 mL of C-o-Phen in a borosilicate glass buret with a 1-cm² cross-section at a flow rate of 1 mL/min. The concentrations of Pt, Pd, Rh and Ru in the effluent and influent, determined by dc plasma spectrometry, are given in Tables 3 and 4 as a function of the number of column volumes of solution passed through each column.

TABLE 3

| | Solution A | | |
|---|---|---|---|
| | Concentrations, mg/L | | |
| CV | Pt | Pd | Rh |
| 2 | <0.7 | <0.02 | 3.1 |
| 3 | <0.6 | <0.02 | 4.7 |
| 4 | <0.5 | <0.02 | 16.6 |
| 5 | <0.8 | <0.02 | 18.9 |

TABLE 3-continued

| | Solution A Concentrations, mg/L | | |
|---|---|---|---|
| CV | Pt | Pd | Rh |
| 11 | <0.6 | <0.05 | 6.2 |
| 13 | <0.8 | 0.01 | 6.5 |
| 20 | <0.7 | 0.06 | 5.3 |
| 25 | <0.8 | <0.03 | 5.6 |
| 30 | <0.5 | <0.04 | 6.0 |
| Infl. | 16.1 | 20.2 | 22.8 |

TABLE 4

| | Solution B Concentrations, mg/L | | |
|---|---|---|---|
| CV | Pt | Pd | Ru |
| 3 | <0.7 | 0.22 | 0.93 |
| 4 | <0.4 | 0.19 | 5.6 |
| 5 | <0.5 | 0.13 | 8.7 |
| 7 | <0.9 | 0.04 | 8.0 |
| 13 | <0.6 | 0.04 | 8.4 |
| 15 | <0.7 | <0.01 | 7.9 |
| 20 | <0.8 | <0.04 | 8.4 |
| 25 | <0.9 | <0.05 | 8.9 |
| 30 | <0.8 | <0.03 | 9.4 |
| Infl. | 16.1 | 19.4 | 19.4 |

The results show that 1,10-phenanthroline sorbed on charcoal is effective in removing Pt and Pd from Rh and Ru solution.

What is claimed is:

1. A process for removing one or more transition metal ions selected from the group consisting of one or more ions of the elements of Groups Va, VIa, VIIa, VIII, Ib and IIb of the Periodic Table from a liquid containing said transition metal ions which comprises passing said liquid over a composition including an activated carbonaceous porous support having interconnected pores wherein said support has an internal surface which contains a heteropolycyclic moiety capable of forming a stable compound or complex with said transition metal ions, said heteropolycyclic moiety containing a bipyridyl structure or a phenanthroline structure said heteropolycyclic moiety being present in an amount effective to form a compound or complex with said transition metal ions.

2. The process of claim 1 wherein said heteropolycyclic moiety contains a phenanthroline structure.

3. The process of claim 1 wherein said liquid is an aqueous solution.

4. The process of claim wherein said transition metal ions include one or more ions selected from the group consisting of iron, cobalt, nickel and copper ions.

5. The process of claim 1 wherein said heteropolycyclic moiety is attached to said porous support by sorption from solution.

6. The process of claim 1 wherein said heteropolycyclic moiety is attached to said porous support without covalent bonding of said heteropolycyclic moiety to said support.

7. The process of claim 1 wherein said liquid contains an excess of other multivalent metal ions over said transition metal ions.

8. The process of claim 7 wherein the concentration of said transition metal ions in said liquid after passing said liquid over said composition is less than about one part-per-million relative to the concentration of said other metal ions.

9. The process of claim 7 wherein said other metal ions include one or more ions selected from the group consisting of titanium, zirconium, hafnium, thorium, lanthanum, aluminum, gallium, indium, scandium and yttrium ions.

10. The process of claim 9 wherein the concentration of said other metal ions in said liquid is at least about 10 g/L.

11. The process of claim 9 wherein said other metal ions include zirconium or hafnium.

12. The process of claim 1 wherein said porous support is charcoal.

13. A process for separating two or more transition metal ions selected from the group consisting of ions of the elements of Groups Va, VIa, VIIa, VIII, Ib and IIb of the Periodic Table comprising passing a liquid containing said transition metal ions through a column containing a composition including a porous support having interconnected pores thereby producing an effluent, wherein said support has an internal surface which contains a heteropolycyclic moiety capable of forming a compound or complex with at least one of said transition metal ions, said heteropolycyclic moiety containing a bipyridyl structure or a phenanthroline structure, said heteropolycyclic moiety being present in an amount effective to cause separation between the appearance of said transition metal ions of groups of said transition metal ions in the effluent of the column.

14. The process of claim 13 wherein said heteropolycyclic moiety contains a phenanthroline structure.

15. The process of claim 13 wherein said liquid is an aqueous solution.

16. The process of claim 4 or claim 15 wherein said aqueous solution has a pH below about 4.

17. The process of claim 4 or claim 15 wherein said aqueous solution has a pH below about 2.

18. The process of claim 13 wherein said transition metal ions are selected from the group consisting of rhenium, ruthenium, rhodium, palladium, osmium, iridium and platinum ions.

19. The process of claim 13 wherein said porous support is charcoal.

20. The process of claim 13 wherein said heteropolycyclic moiety is attached to said porous support by sorption from solution.

21. The process of claim 1 or claim 13 wherein the concentrations of one or more transition metal ions selected from said group of ions on said composition are higher by a factor of at least about 10 or more than the concentrations of said transition metal ions in said liquid before said liquid is contacted with said composition.

22. The process of claim 21 wherein said factor is at least about 50.

23. The process of claim 21 wherein said transition metal ions include radioactive ions.

24. The process of claim 21 wherein said transition metal ions include one or more ions selected from the group consisting of rhenium, ruthenium, rhodium, palladium, osmium, iridium and platinum ions.

25. The process of claim 21 wherein said composition includes charcoal as a porous support.

26. The process of claim 25 wherein said porous support is subsequently incinerated.

27. The process of claim 21 wherein said composition is subsequently eluted to bring said transition metal ions back into solution.

* * * * *